United States Patent [19]
Liu et al.

[11] Patent Number: 6,108,169
[45] Date of Patent: Aug. 22, 2000

[54] RANDOMLY LASER-TEXTURED MAGNETIC RECORDING MEDIA

[75] Inventors: Hain-Ling Liu, Westborough; Kannimangalam V. Viswanathan, Shrewsbury; Patrick L. Hearn, Acton, all of Mass.

[73] Assignee: Quantum Corporation, Milpitas, Calif.

[21] Appl. No.: 08/984,436

[22] Filed: Dec. 3, 1997

[51] Int. Cl.[7] ...................................................... G11B 5/82
[52] U.S. Cl. .......................... 360/135; 360/131; 427/554; 427/555
[58] Field of Search ................................... 360/131, 135; 427/554, 555

[56] References Cited

U.S. PATENT DOCUMENTS 5,768,076   6/1998   Baumgart et al. ...................... 360/135

Primary Examiner—George J. Letscher
Attorney, Agent, or Firm—Steven G. Roeder

[57] ABSTRACT

A device and method for storing magnetically readable data are provided, the device including a disk having a substantially rigid, non-magnetizable substrate having a substantially planar surface and a magnetizable film having a substantially uniform thickness formed over the substantially planar surface. The disk has an outer surface having a nominal surface plane, and the outer surface includes a plurality of marks, each having a bump height above the nominal surface plane, a crater depth below the nominal surface plane, a mark radius, a bump radius of curvature, a crater radius of curvature and a separation from a consecutive mark, and at least one of the bump height, the crater depth, the mark radius, the bump radius of curvature, the crater radius of curvature and the separation is substantially randomly distributed according to any distribution of random variables such as, for example, a Gaussian normal, uniform, Poisson-like or Bernoulli-like binomial-like distribution.

20 Claims, 10 Drawing Sheets

RANDOMLY LASER-TEXTURED MAGNETIC RECORDING MEDIA

BACKGROUND OF THE INVENTION

1. Field of the Invention

This invention relates generally to minimizing the suspension resonance and air-bearing resonance of data transducing heads, and to minimizing the head-to-disk contact and wear, and, more particularly, to a device and apparatus for minimizing the suspension resonance and air-bearing resonance of data transducing heads and for minimizing the head-to-disk contact and wear during contact start-stop processes with laser-textured magnetic recording media.

2. Description of the Related Art

Magnetic disks and disk drives, with their associated data transducing heads, are well known for their utility in storing data and information in magnetizable media. Typically, for hard disk drives, one or more rigid disks, having magnetizable media disposed thereon, are rotated at high speeds about their symmetry axes while data transducing heads are positioned as close as possible to the reading and recording surfaces, i.e., at minimized "flying heights." The data transducing heads, typically deposited on the trailing edge of a slider, are maintained at controllable distances from the reading and recording surfaces, during reading and recording operations, with the sliders (and the data transducing heads deposited thereon) floating on "air-bearings" as the disks rotate. The data transducing heads generally contact their associated reading and recording surfaces only when the disks are not rotating, during acceleration just after the disks start to rotate and during deceleration just before the disks stop rotating. The need to minimize flying height in order to increase data storage density is conditioned by the need to avoid excessive static friction ("stiction") and dynamic friction during contact start-stop processes such as the starting and stopping of disk rotation.

One traditional way of minimizing flying height is to make the reading and recording surfaces, as well as the data transducing head surface, as smooth as possible. However, such surface smoothness may lead to excessive stiction and friction during contact start-stop processes.

In U.S. Pat. Nos. 5,062,021 and 5,108,781 to Ranjan et al., the recording surfaces of magnetic disks are described as being intentionally roughened to reduce head/disk rest stiction. For example, laser-texturing has been used wherein the magnetic disk is rotated at a controlled rate corresponding to the firing frequency of a pulsed laser, forming a spiral of crater-like depressions and rims in the magnetic disk surface with repeated turns of the spiral combining to form an annular band. Laser-texturing of the surfaces of magnetic disks has provided a high degree of control previously unattainable with grit cloth or paper texturing. The accuracy of the laser enables the precise delineation of the laser-textured area boundaries. The laser power, pulse length and focusing have been made variable to control the size and profile of the laser spots or marks. The pulse frequency, in conjunction with the rotation or other relative translation of the magnetic disk have also been controlled to determine the spacing among adjacent marks.

A major disadvantage of conventional laser-texturing of magnetic disks is that the laser-textured magnetic disks are typically patterned with a well-defined periodicity of spot height, shape and separation. This well-defined periodicity in spot height, shape and separation can easily resonate the suspension and air-bearing of the data transducing head. These resonances, in turn, can greatly increase the head/disk contact forces, leading to a deterioration in tribological performance.

The present invention is directed to overcoming, or at least reducing the effects of, one or more of the problems set forth above.

SUMMARY OF INVENTION

In one aspect of the present invention, an apparatus is provided for storing magnetically readable data, the device including a disk having a substantially rigid, non-magnetizable substrate having a substantially planar surface and a magnetizable film having a substantially uniform thickness formed over the substantially planar surface. The disk has an outer surface having a nominal surface plane, wherein the outer surface includes a plurality of marks, each having a bump height above the nominal surface plane, a crater depth below the nominal surface plane, a mark radius, a bump radius of curvature, a crater radius of curvature and a separation from a consecutive mark, and at least one of the bump height, the crater depth, the mark radius, the bump radius of curvature, the crater radius of curvature and the separation is substantially randomly distributed. Alternatively, any one of the 15 pairs (such as the bump height and the crater depth), the 20 triplets (such as the bump height, the bump radius of curvature and the separation), the 15 quadruplets (such as the mark radius, the crater depth, the bump radius of curvature and the separation), the 6 quintuplets (such as the bump height, the crater depth, the bump radius of curvature, the crater radius of curvature and the separation) or the sextet (the bump height, the crater depth, the mark radius, the bump radius of curvature, the crater radius of curvature and the separation), formed from the bump height, the crater depth, the mark radius, the bump radius of curvature, the crater radius of curvature and the separation, may be substantially randomly distributed. The bump height and/or the crater depth and/or the mark radius and/or the bump radius of curvature and/or the crater radius of curvature and/or the separation may be randomly distributed according to any distribution of random variables such as, for example, the Gaussian normal distribution, the uniform distribution, a Poisson-like distribution or a Bernoulli-like binomial-like distribution. In another aspect of the present invention, a disk drive assembly is provided using such an apparatus for storing magnetically readable data.

In another aspect of the instant invention, a method is provided for manufacturing magnetic media operated in conjunction with magnetic transducing heads for the recording and reading of magnetic data, the method including forming a disk having a substantially rigid, non-magnetizable substrate having a substantially planar surface and a magnetizable film having a substantially uniform thickness formed over the substantially planar surface. The disk has an outer surface having a nominal surface plane and the method includes creating a plurality of marks at a plurality of locations on the outer surface, each of the plurality of marks having a bump height above the nominal surface plane, a crater depth below the nominal surface plane, a mark radius, a bump radius of curvature, a crater radius of curvature and a separation from a consecutive mark, wherein at least one of the bump height, the crater depth, the mark radius, the bump radius of curvature, the crater radius of curvature and the separation is substantially randomly distributed. The power level of the pulsed laser, the angle of incidence of the pulsed laser beam with the nominal surface plane of the outer surface of the disc, the duration of firing of the pulsed laser, or the frequency of firing of the pulsed laser may be varied substantially randomly, with or without rotating the disk at a substantially randomly varying rotational speed. Alternatively, or additionally, the disk and/or the pulsed laser may be linearly translated relative to each other at a substantially randomly varying linear speed.

BRIEF DESCRIPTION OF THE DRAWINGS

Other objects and advantages of the invention will become apparent upon reading the following detailed description and upon reference to the drawings in which.

Figure 1:
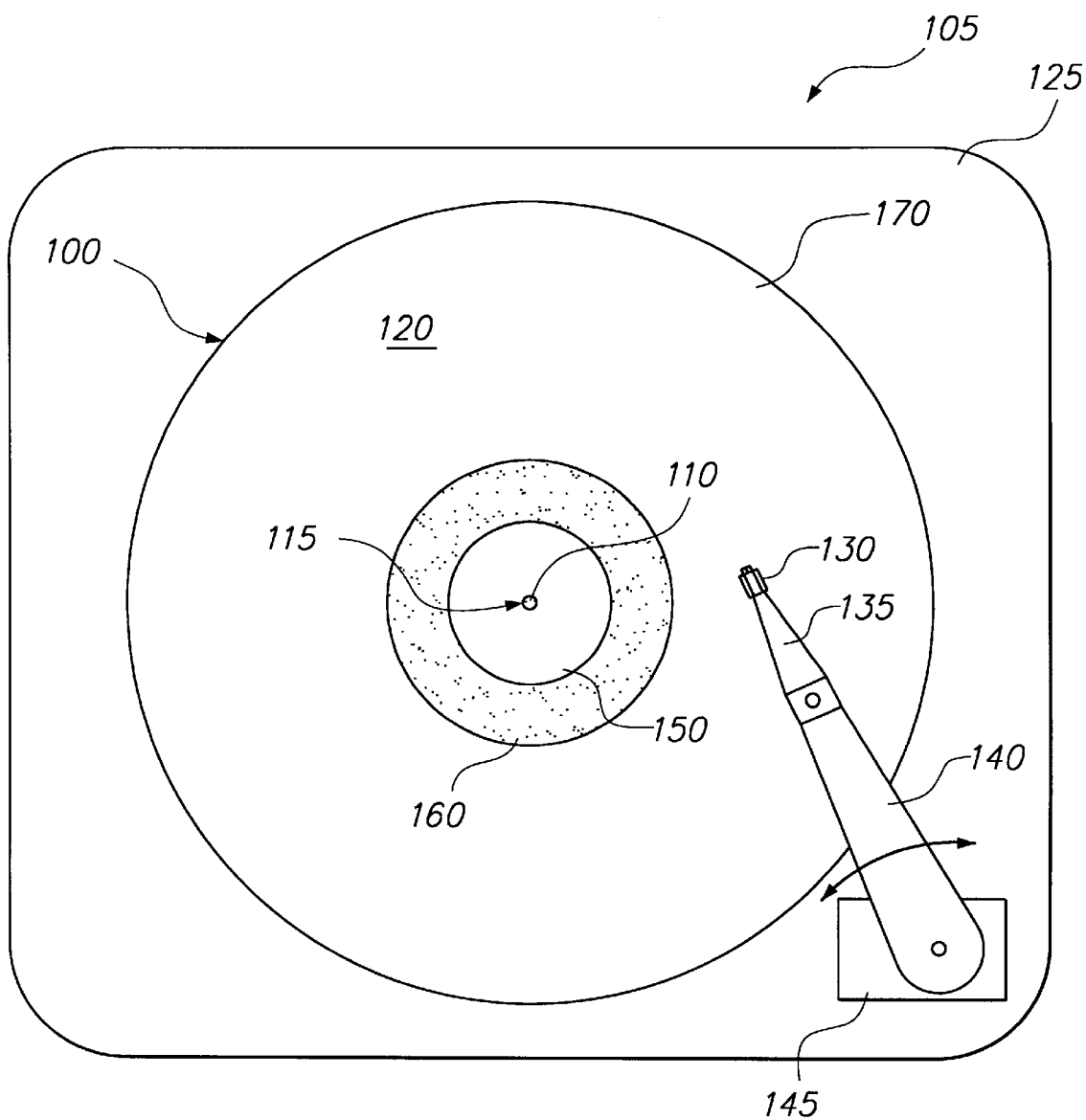
FIG. 1 is a plan view of a rotatable rigid magnetic recording disk and a data transducing head movable along the disc, the disk recording surface having a data transducing head contact region formed in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
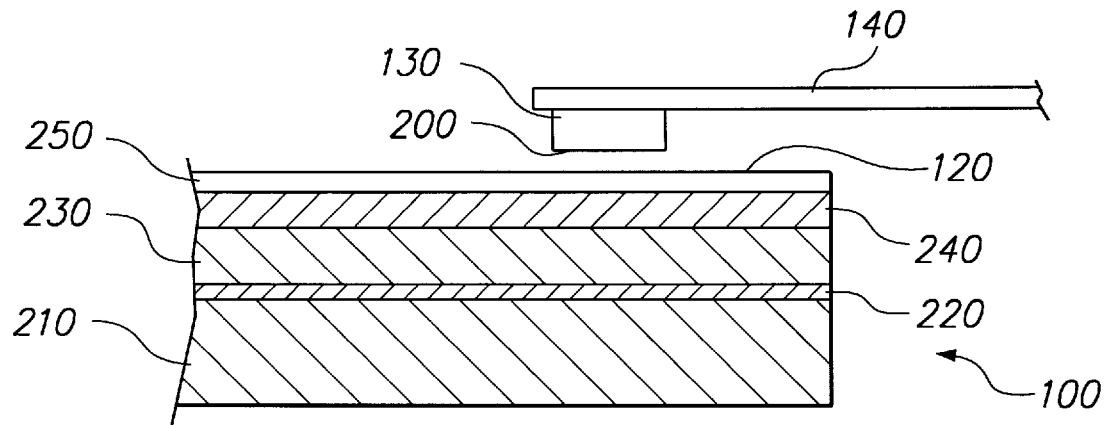
FIG. 2 is an enlarged partial sectional view of the magnetic recording disk of FIG. 1.

Turning now to the drawings, and in particular to FIGS. 1 and 2, showing a disk drive assembly 105 and a data reading and recording medium including a rigid magnetic disk 100 rotatable about a vertical spindle 115 of the disk drive assembly 105, the vertical spindle 115 having a vertical axis through a central opening 110 in the disk 100, the vertical axis being substantially perpendicular to a substantially planar and horizontal upper surface 120 of the disk 100 and to a base plate 125 of the disk drive assembly 105. A magnetic data transducing head 130 is supported by a head suspension 135 on a head support arm 140 attached to a carriage assembly 145 mounted on the base plate 125 of the disk drive assembly 105 for rotatably reciprocating the data head 130 along the disk 100, as shown by the arcuate double arrow. The suspension 135 allows for gimbaling action of the data head 130, limited vertical travel and limited rotation, about pitch and roll axes.

The central opening 110 accommodates the vertical spindle 115 of the disk drive assembly 105 operable to rotate the disk 100. An inner annular sector 150 of the disk 100 is used for clamping the disk 100 to the vertical spindle 115 of the disk drive assembly 105. Adjacent the inner annular sector 150 is an annular head contact region or area or band 160, and adjacent the head contact region 160 is an annular data storage region or area or sector 170.

While the disk 100 is at rest or is rotating at a speed substantially below the normal operating range, the data head 130 is in contact with the upper surface 120. However, when the disk 100 is rotating at speeds at least near the normal operating range, an "air bearing" of air flowing between the data head 130 and the upper surface 120 in the direction of the disk 100 rotation supports the data head 130 substantially parallel to, and spaced apart from, the upper surface 120. The distance between a planar bottom surface 200 of the data head 130 and the upper surface 120 is generally known as the "flying height" of the data head 130 and is currently typically about 50 nanometers (nm) or less. Preferably, the flying height is low so that the data head 130 is as close as possible to the upper surface 120 of the disk 100 in order to increase the density of data that may be magnetically stored on the disk 100.

The head support arm 140 moves selectively to position the data head 130 over the reading and recording surface of the disk 100. The position of the data head 130 is controlled before, during and after data reading and recording operations. For example, during such operations, data head 130, supported on the air bearing, may be positioned at selected locations over the data storage region 170 to record or retrieve data at a specified data address. In between such operations, the data head 130 may be positioned anywhere over the data storage region 170. During deceleration of the disk 100, for example, when the system using the disk 100 is shut down, the head support arm 140 may be positioned inward to position the data head 130 over the head contact region 160 even before the data head 130 contacts the upper surface 120 of the disk 100. When the system using the disk 100 is turned on, as the disk 100 accelerates from rest, the data head 130 remains in contact with the head contact region 160 until the air bearing is established. Once the air bearing is established, the head support arm 140 may then move the data head 130 outward over the data storage region 170 of the disk 100.

The upper surface 120 of the disk 100 has two regions, the head contact region 160 and the data storage region 170, that preferably have different surface textures. The surface roughness of the head contact region 160 is much higher than the surface roughness of the data storage region 170, measuring the surface roughness by the heights of surface features above a nominal horizontal plane of the upper surface 120 of the disk 100. As shown in FIG. 2, the disk 100 has a multiplicity of layers, including a substrate layer 210, a texturized layer 220, an underlayer 230, a recording layer 240 and a protective overlayer 250 over the recording layer 240. More particularly, a polished aluminum (Al) substrate disk 210 has a nickel-phosphorus (Ni—P) alloy layer 220 plated on an upper surface of the Al substrate disk 210 to a thickness in a range of about 8 μm to about 12 μm. The Ni—P alloy layer 220 is initially untexturized by being polished or ground or otherwise machined to have a surface roughness sufficient, for example, for the data storage region 170 of the disk 100.

Figure 3:
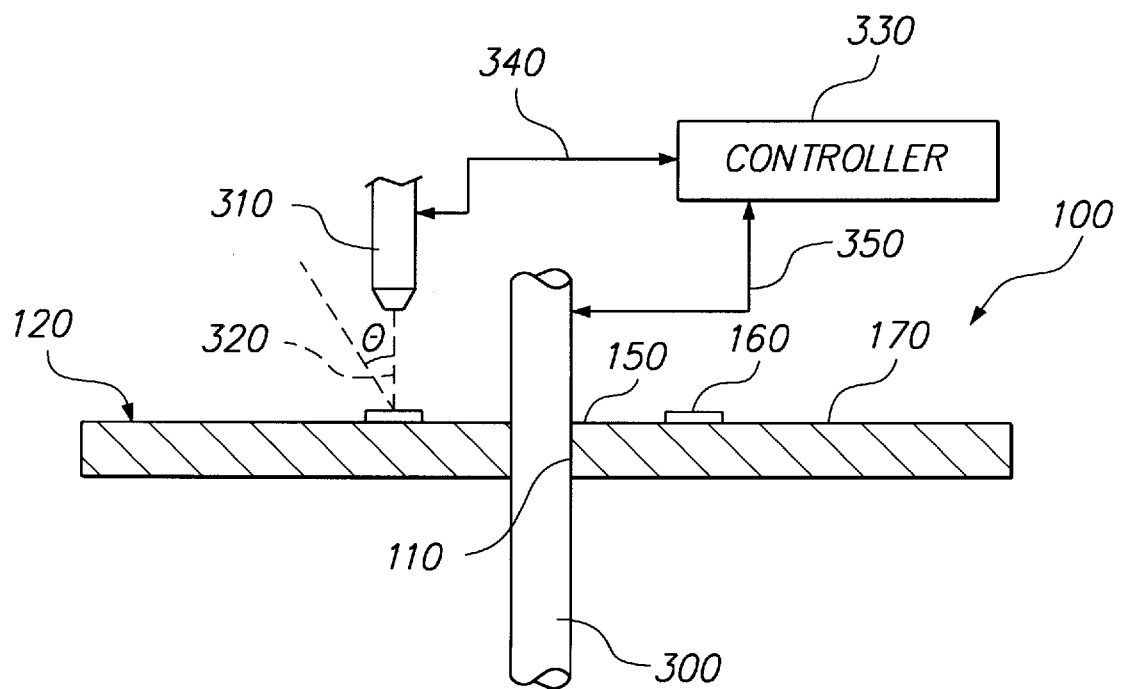
FIG. 3 is a schematic view of an apparatus for controllably texturing the magnetic recording disk of FIG. 1 to provide the data transducing head contact region formed in accordance with an embodiment of the present invention.

The Ni—P alloy layer 220 is then preferably texturized with an apparatus shown schematically in FIG. 3. A spindle 300 supports the disk 100, and a pulsed mode neodymium-doped yttrium aluminum garnet (Nd:YAG) laser 310 is movably supported above the disk 100 by a support structure (not shown). The laser 310 generates a pulsed laser beam 320 focused selectively on the upper surface of the Ni—P alloy layer 220 and fires the pulsed laser beam 320 at a selected frequency and firing rate onto the disk 100 while the spindle 300 rotates disk 100 at a selected rotational speed. The laser 310 may be oriented substantially vertically, as shown in FIG. 3, or, alternatively, may be oriented substantially at a selected angle δ with respect to the vertical direction, also as shown in FIG. 3. The laser 310 may be moved controllably and stepped radially of the disk 100 and the spindle 300. Of course, one of ordinary skill in the art of laser texturing will recognize that other types of laser besides the Nd:YAG laser 310 as shown may also be used, such as an argon (Ar) gas laser, a carbon dioxide ($CO_2$) gas laser or any other equivalent laser that produces photons that may be absorbed by a layer such as the Ni—P alloy layer 220 so that the layer may be suitably laser texturized.

Figure 4:
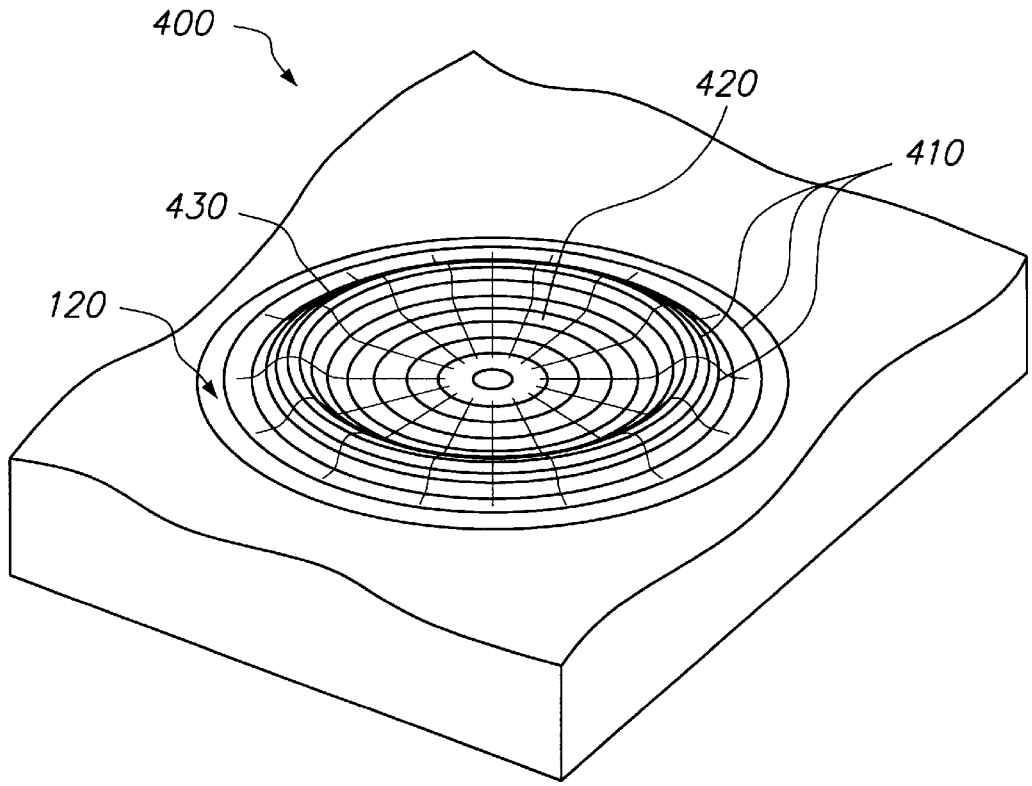
FIG. 4 is a substantially enlarged perspective view of a laser mark formed in the surface of a magnetic recording disc.

The texturizing may be controlled both at the level of individual laser marks or bumps and at the level of a pattern or arrangement of laser marks. The nature of the individual laser marks is controlled through the controller 330, primarily by controlling the intensity or peak energy at which the laser 310 is fired and the duration or pulse width of each firing, and secondarily by controlling the way in which the pulsed laser beam 320 is focused and the selected angle δ of the pulsed laser beam 320 with respect to the vertical. A small angle δ yields a substantially circular laser mark, as shown schematically by laser mark 400 in FIG. 4. A larger angle δ would yield a more elliptical or oblong laser mark, as shown schematically by the cross-sectional profile of laser mark 500 in FIG. 5 and by the cross-sectional profile of laser mark 600 in FIG. 6. The pattern or arrangement of the laser marks is also controlled through the controller 330 by controlling the frequency of the repeated firings of the laser 310, the rotational speed of the disk 100 about the spindle 300 and the amount of radial stepping by the laser 310. The controller 330 sends commands to, and may receive feedback from, laser 310 through the two-way link 340, while the controller 330 sends commands to, and may receive feedback from, spindle 300 through the two-way link 350.

Once the Ni—P alloy layer 220 has been texturized, the remaining layers, the underlayer 230, the recording layer 240 and the protective overlayer 250, as shown in FIG. 2, are applied, preferably by vacuum deposition, completing the disk 100. More particularly, a layer of chrome with a thickness in a range of about 20 nm to about 40 nm may be sputter deposited onto the upper surface of the texturized Ni—P alloy layer 220, forming an underlayer 230 for the recording layer 240. The recording layer 240 may be formed by sputtering a cobalt nickel alloy, a cobalt chromium alloy, or the like, to a thickness in a range of about 15 nm to about 30 nm onto the recording underlayer 230. The protective overlayer 250 may be formed by depositing carbon, for example, onto the recording layer 240 to a thickness in a range of about 6 nm to about 12 nm. Optionally, an additional layer of lubricant (not shown) may be deposited onto the protective overlayer 250 to a thickness in a range of about 1 nm to about 1.5 nm. A suitable lubricant may be, for example, PFPE lubricant or Zdol. The layers above the texturized Ni-P alloy layer 220 tend to replicate the texturized contours of the texturized Ni—P alloy layer 220. Alternatively, any of the other layers of the disc, the Al substrate layer 210, the chrome recording underlayer 230, the recording layer 240, or the protective carbon overlayer 250 may be texturized by the pulsed laser 310 with the apparatus shown schematically in FIG. 3.

Figure 5:
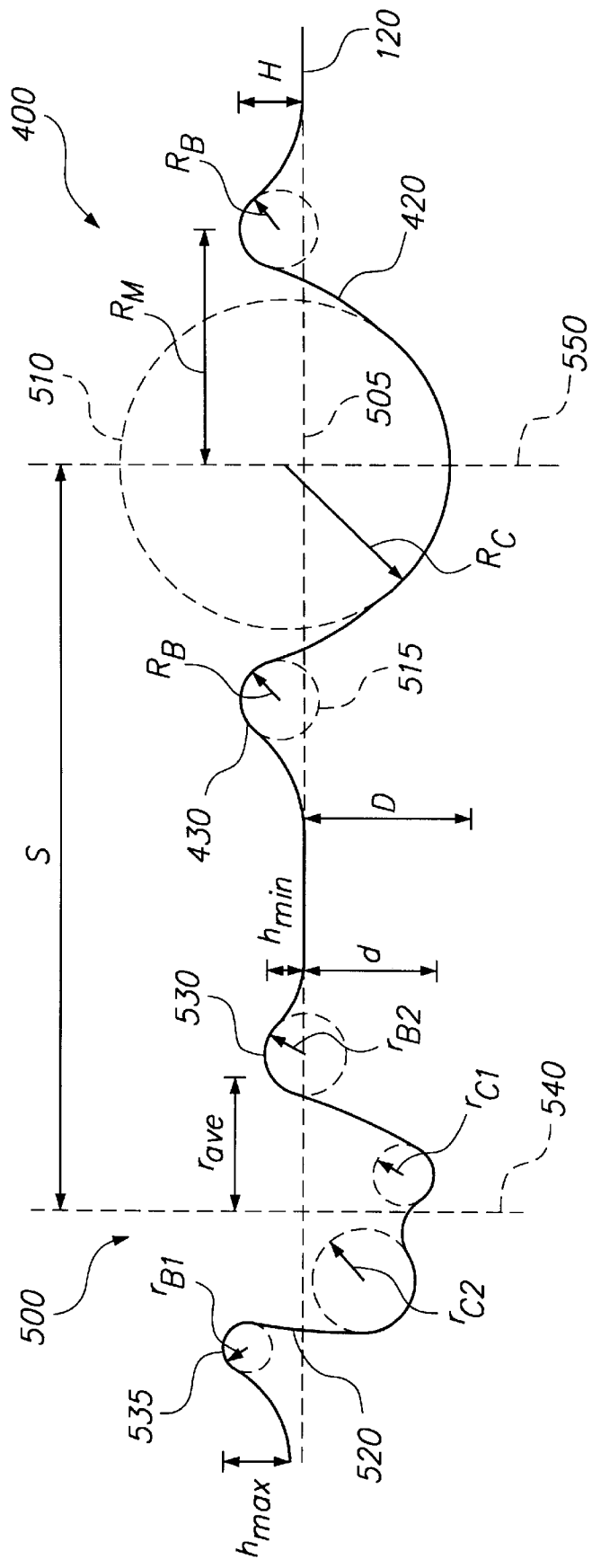
FIG. 5 is a schematic view of a cross-sectional profile of the laser mark of FIG. 4 and of a neighboring laser mark.

As noted above, a typical laser mark 400 is shown in FIG. 4, and shown schematically in cross-sectional profile in FIG. 5. The contour lines 410 show a crater 420 formed in the upper or outer surface 120 of the disk 100. The closer the contour lines 410 are, the steeper the slope of the corresponding topography of the surface, and the farther apart the contour lines 410 are, the gentler the slope of the corresponding surface topography. The bump or rim 430 of the laser mark 400 that surrounds the crater 420 is shown as being substantially circular, with mark radius $R_M$, as shown in FIG. 5. The mark radius $R_M$ may range from about 3 μm to about 50 μm, and may preferably be about 30 μm. The bump or rim 430 has a bump height H above the nominal surface plane 505 of the outer surface 120 of the disk 100. The bump height H may range from about 9 nm to about 33 nm, and may preferably be about 24 nm. The crater 420 has a crater depth D below the nominal surface plane 505 of the outer surface 120 of the disk 100. The crater depth D may range from about 18 nm to about 66 nm, and may preferably be about 48 nm. The crater depth D of the crater 420 may also preferably be about twice the bump height H of the bump or rim 430.

The bump or rim 430 of the laser mark 400 and the crater 420 both have shapes that may be further characterized by respective radii of curvature, as shown in FIG. 5. The bump radius of curvature $R_B$ may be defined as the radius of the bump circle of curvature 510 tangent to the cross-sectional profile of the rim 430 at the top of the bump on the concave side of the cross-sectional profile. The bump radius of curvature $R_B$ may range preferably from about 0.1 μm to about 100 μpm. The crater radius of curvature $R_C$ may be defined as the radius of the crater circle of curvature 515 tangent to the cross-sectional profile of the crater 420 at the bottom of the crater 420 also on the concave side of the cross-sectional profile. The crater radius of curvature $R_C$ may range from about 0.1 μm to about 1000 μm and may range preferably from about 1 μm to about 100 μm.

Also shown schematically in FIG. 5 is the cross-sectional profile of another laser mark 500 which has a more irregular cross-sectional profile and may be formed, for example, when larger values of the angle δ are used for the laser beam 320. The rim of the crater 525 has a lowest point 530, at a bump height $h_{min}$ above the nominal surface plane 505, and a highest point 535, at a bump height $h_{max}$ above the nominal surface plane 505. The crater 520 has a crater depth d below the nominal surface plane 505. An average effective bump height $h_{ave}$ for the laser mark 500 may be computed using $h_{min}$ and $h_{max}$. Similarly, an average effective mark radius $r_{Mave}$ may be computed for the laser mark 500 using the values $r_{Mmin}$ and $r_{Mmax}$ for the closest distance of the rim of the laser mark 500 to the central vertical axis 540 and the farthest distance of the rim of the laser mark 500 from the central vertical axis 540, respectively.

An average effective bump radius of curvature $r_{Bave}$ may be computed for the laser mark 500 using the values $r_{Bmin}$ and $r_{Bmax}$ for the minimum bump radius of curvature and the maximum bump radius of curvature, respectively. Note that the representative bump radius of curvature values $r_{B1}$ and $r_{B2}$ shown in FIG. 5 may or may not coincide with the values $r_{Bmin}$ and $r_{Bmax}$ for the minimum and the maximum bump radii of curvature, respectively, for the laser mark 500. Similarly, an average effective crater radius of curvature $r_{Cave}$ may be computed for the laser mark 500 using the values $r_{Cmin}$ and $r_{Cmax}$ for the minimum crater radius of curvature and the maximum crater radius of curvature, respectively. Note that the representative crater radius of curvature values $r_{C1}$ and $r_{C2}$ shown in FIG. 5 may or may not coincide with the values $r_{Cmin}$ and $r_{Cmax}$ for the minimum and the maximum crater radii of curvature, respectively, for the laser mark 500.

The separation S between the laser mark 400 and the neighboring laser mark 500 is the distance between the central vertical axis 540 of the laser mark 500 and the central vertical axis 550 of the laser mark 400. The separation S may range from about 1 μm to about 200 μm and may range preferably from about 5 μm to about 100 μm. Preferably, the separation may be the separation between consecutive laser marks. For example, if laser mark 500 had been formed by the very next firing of laser 310 after laser mark 400 had been formed, then the separation S shown in FIG. 5 would be the separation of laser mark 400 from consecutive laser mark 500.

Figures 6, 7:
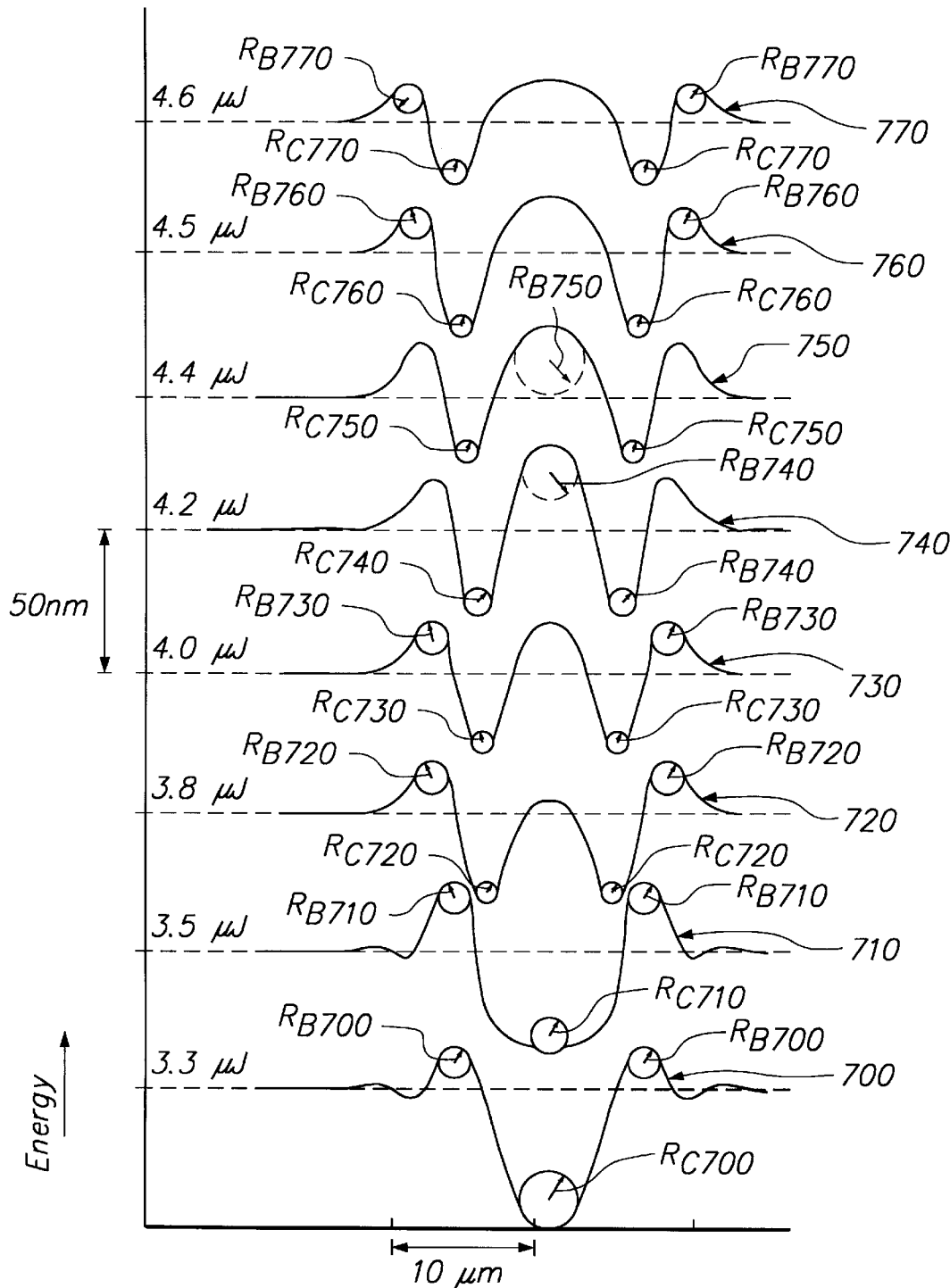
FIG. 6 is a schematic view of a cross-sectional profile illustrating an alternative laser mark shape.
FIG. 7 shows schematic views of cross-sectional profiles of laser marks formed using the apparatus of FIG. 3 illustrating a dependence of laser mark shape on peak energy fired.

FIG. 6 is a schematic view of a cross-sectional profile of a laser mark 600 illustrating an alternative laser mark shape. The laser mark 600 has a shape characterized by a bump radius of curvature $R_{Balt}$ and a crater radius of curvature $R_{Calt}$ and may be formed by varying the power output of the laser 310 shown in FIG. 3 and/or by varying the selected angle δ with respect to the vertical of the pulsed laser beam 320 shown in FIG. 3.

FIG. 7 shows schematic views of cross-sectional profiles of laser marks 700–770 formed using the apparatus of FIG. 3 illustrating a dependence of laser mark shape on the peak energy at which the laser 310 is fired. The abscissas and the horizontal axis shown in FIG. 7 are measured in micrometers (μm), as shown by the horizontal double arrow (representing a length of 10 μm), and the ordinates and the vertical axis shown in FIG. 7 are measured in nanometers (nm), as shown by the vertical double arrow (representing a length of 50 μm), exaggerating the heights of the bumps and the depths of the craters of the laser marks 700–770. The peak energy of laser firing also increases from the bottom to the top of FIG. 7. For example, laser mark 700 may be formed when a peak laser energy of 3.3 microjoules (μJ) is used, laser mark 710 may be formed when a peak laser energy of 3.5 μJ is used, laser mark 720 may be formed when a peak laser energy of 3.8 μJ is used, laser mark 730 may be formed when a peak laser energy of 4.0 μJ is used, laser mark 740 may be formed when a peak laser energy of 4.2 μJ is used, laser mark 750 may be formed when a peak laser energy of 4.4 μJ is used, laser mark 760 may be formed when a peak laser energy of 4.5 μJ is used and laser mark 770 may be formed when a peak laser energy of 4.6 μJ is used.

The shape of laser mark 700 may be characterized by a bump radius of curvature $R_{B700}$ and a crater radius of curvature $R_{C700}$, as shown in FIG. 7. Similarly, the shape of laser mark 710 may be characterized by a bump radius of curvature $R_{B710}$ and a crater radius of curvature $R_{C710}$, the shape of laser mark 720 may be characterized by a bump radius of curvature $R_{B720}$ and a crater radius of curvature $R_{C720}$, the shape of laser mark 730 may be characterized by a bump radius of curvature $R_{B730}$ and a crater radius of curvature $R_{C730}$, the shape of laser mark 740 may be characterized by a bump radius of curvature $R_{B740}$ and a crater radius of curvature $R_{C740}$, the shape of laser mark 750 may be characterized by a bump radius of curvature $R_{B750}$ and a crater radius of curvature $R_{C750}$, the shape of laser mark 760 may be characterized by a bump radius of curvature $R_{B760}$ and a crater radius of curvature $R_{C760}$ and the shape of laser mark 770 may be characterized by a bump radius of curvature $R_{B770}$ and a crater radius of curvature $R_{C770}$. As shown in FIG. 7, the bump radius of curvature may be characteristic of the highest of the bumps associated with the respective laser mark and the crater radius of curvature may be characteristic of the deepest of the craters associated with the respective laser mark.

The above-mentioned process parameters controlled by the controller 330, namely the intensity or peak energy at which the laser 310 is fired and the duration or pulse width of each firing, and the focusing and angling of the pulsed laser beam 320, may be varied to influence the dimensions such as the bump height, crater depth, the mark radius, the bump radius of curvature and the crater radius of curvature of the laser marks. The bump height of the rim may be considered particularly critical, and varies with the peak power of the laser 310 over a preferred range from about 0.1 kilowatts (kW) to about 5 kW, depending, of course, on the particular laser employed and the particular surface being textured. For a Nd:YAG laser 310 and the texturized Ni—P alloy layer 220, the range from about 0.1 kilowatts (kW) to about 5 kW may prove advantageous. The separation between the laser marks may also be controlled by the controller 330. For example, the disk 100 may be rotated about the spindle 300 at rotational speeds ranging from about 10 rpm to about 100 rpm, and the firing frequency of the laser 310 may range from about 5 kilohertz (kH) to about 20 kH. The separation between the laser marks may also be controlled by the controller 330 by varying the relative linear translational velocity of the laser 310 in the radial direction of the disk 100. The disk 100 may be at rest relative to the laser 310 moving in the radial direction of the disk 100, or the laser may be at rest relative to the disk 100 moving in the radial direction of the disk 100, or both the disk 100 and the laser 310 may be mutually in motion.

It has been found preferable to have the controller 330 provide random variations of one or more of the process parameters, such as the peak power of the laser 310, the duration or pulse width of each firing of the laser 310, and the focusing and angling of the pulsed laser beam 320, resulting in random variations in one or more of the dimensions such as the bump height, crater depth, the mark radius, the bump radius of curvature and the crater radius of curvature of the laser marks. It has also been found preferable to have the controller 330 provide random variations of one or more of the process parameters, such as the rotational speed of the disk 100 about the spindle 300, the firing frequency of the laser 310 and the relative linear translational velocity of the laser 310 in the radial direction of the disk 100, resulting in random variations in the separation between the laser marks.

Figure 8A:
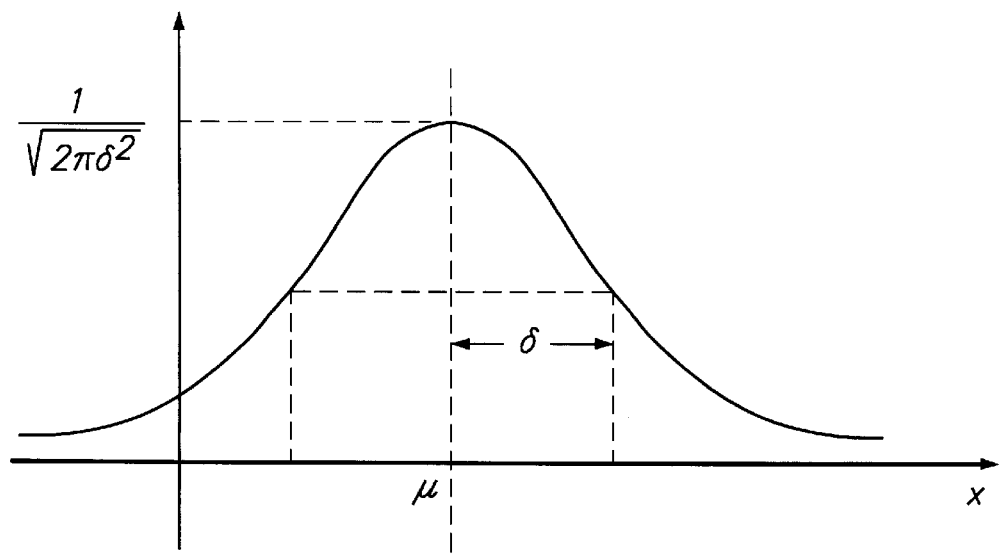
FIGS. 8A–D are graphs of distributions for dimensional aspects of the laser marks formed using the apparatus of FIG. 3.
Figure 8B:
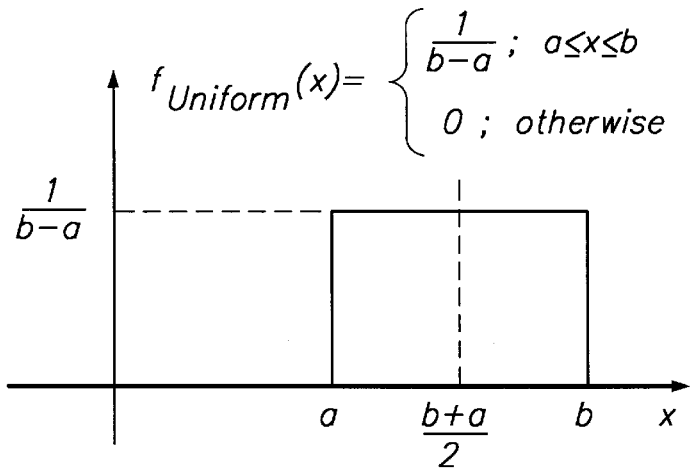
Figure 8C:
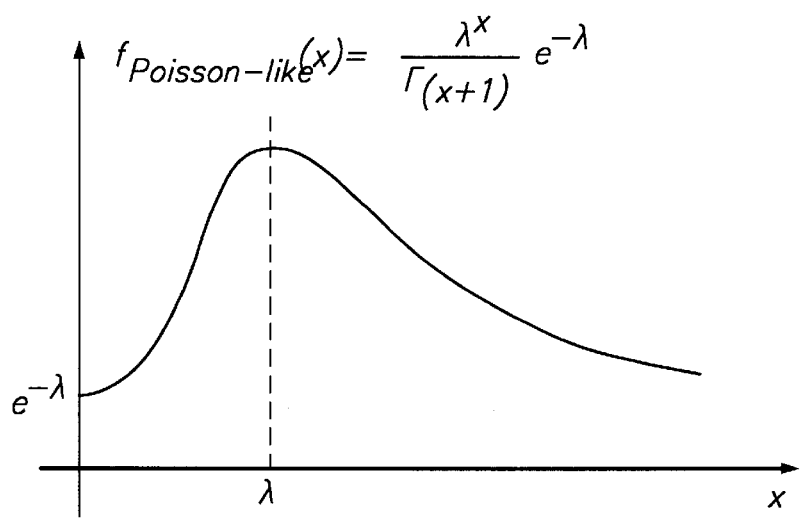
Figure 8D:
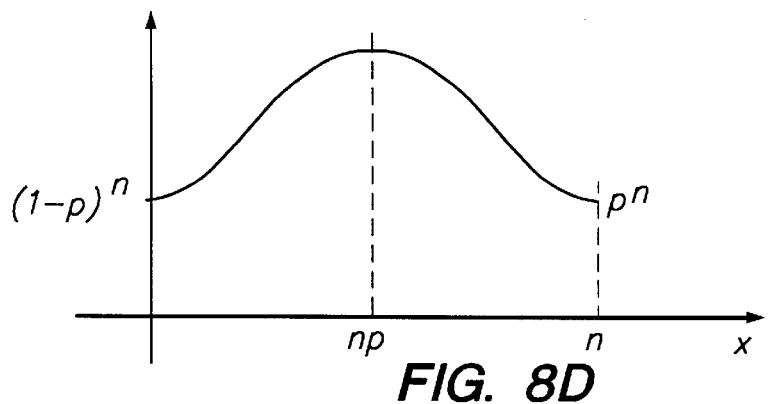

The dimensions such as the bump height, the crater depth, the mark radius, the bump radius of curvature and the crater radius of curvature of the laser marks, and the separation between the laser marks, may be distributed according to any distribution of random variables. For example, the dimension x of the laser marks may be distributed according to a Gaussian normal distribution, as shown in FIG. 8A, with the probability density function:

$$f_{Gaussian}(x;\mu,\sigma) = \frac{1}{\sqrt{2\pi\sigma^2}} \exp\left(-\frac{(x-\mu)^2}{2\sigma^2}\right),$$

where $\mu$ is the mean and $\sigma^2$ is the variance of the distribution. Alternatively, the dimension x of the laser marks may be distributed according to a uniform distribution, as shown in FIG. 8B, with the probability density function:

$$f_{Uniform}(x;a,b) = \frac{1}{(b-a)}, \; a \le x \le b; \quad f_{Uniform}(x;a,b) = 0,$$

otherwise, where $$\frac{(b+a)}{2}$$

is the mean and $$\frac{(b-a)^2}{12}$$

is the variance of the distribution. The dimension x of the laser marks may alternately be distributed according to a Poisson-like continuous distribution, as shown in FIG. 8C, with the probability density function:

$$f_{Poisson-like}(x;\lambda) = \frac{\lambda^x}{\Gamma(x+1)} \exp(-\lambda),$$

where $\lambda$ is both the mean and the variance of the distribution, and the gamma function $$\Gamma(z) = \int_0^\infty e^{-t} t^{z-1} dt$$

generalizes the factorial (z−1)! (for z≧1). The dimension x of the laser marks may also be alternately distributed according to a Bernoulli-like binomial-like continuous distribution, as shown in FIG. 8D, with the probability density function:

$$f_{Bernoulli-like}(x;p,n) = \frac{\Gamma(n+1)}{\Gamma(x+1)\Gamma(n-x+1)} p^x (1-p)^{n-x},$$

where np is the mean and np(1−p) is the variance of the distribution. These distributions are merely illustrative, and the dimension x of the laser marks and/or the separation between the laser marks may be distributed according to any distribution of random variables without being limited, of course, to only the above-given illustrative distributions.

Figure 9A:
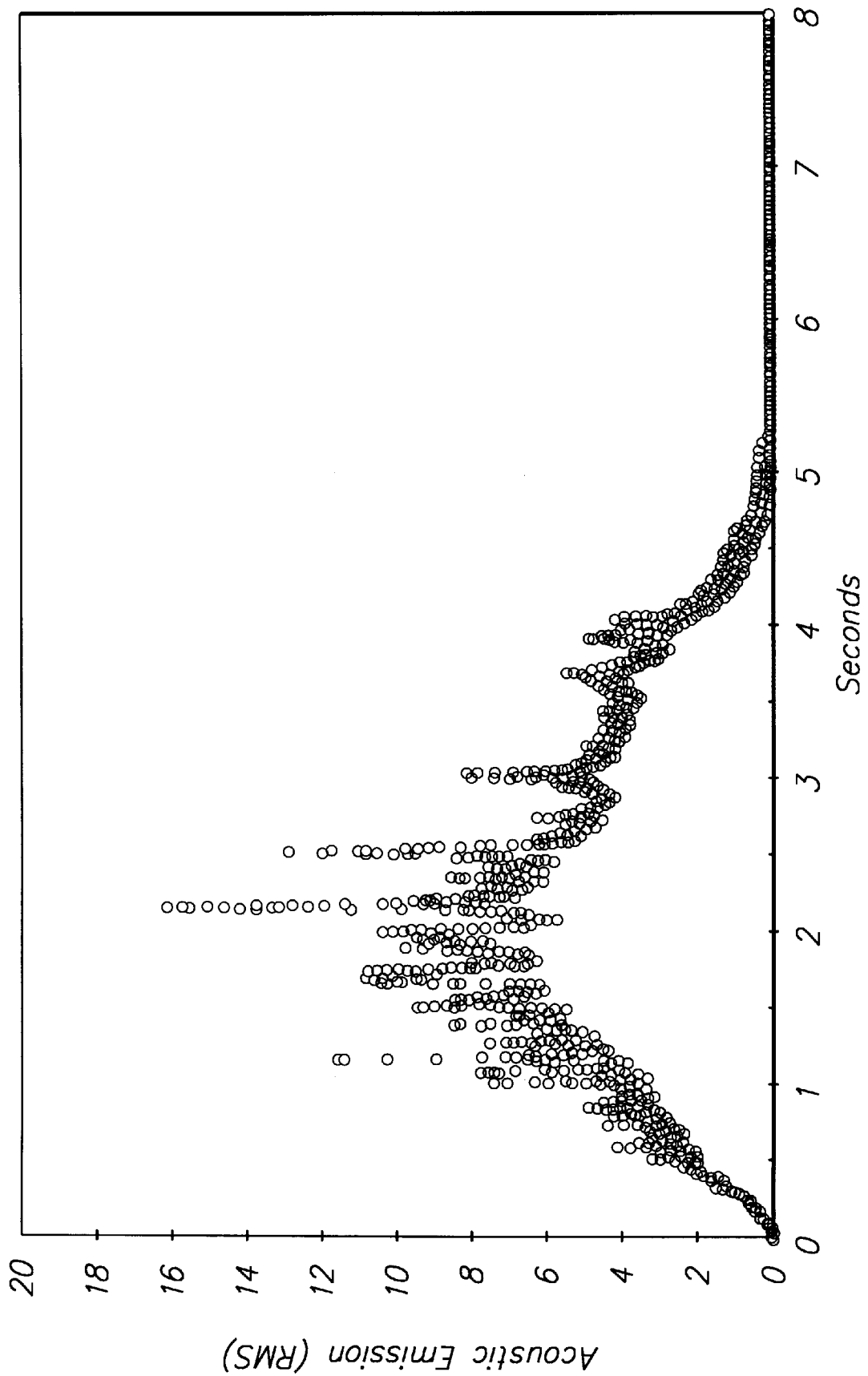
FIGS. 9A and B are graphs of acoustic emissions for conventionally laser-textured and mechanically-textured magnetic recording media, respectively.
Figure 9B:
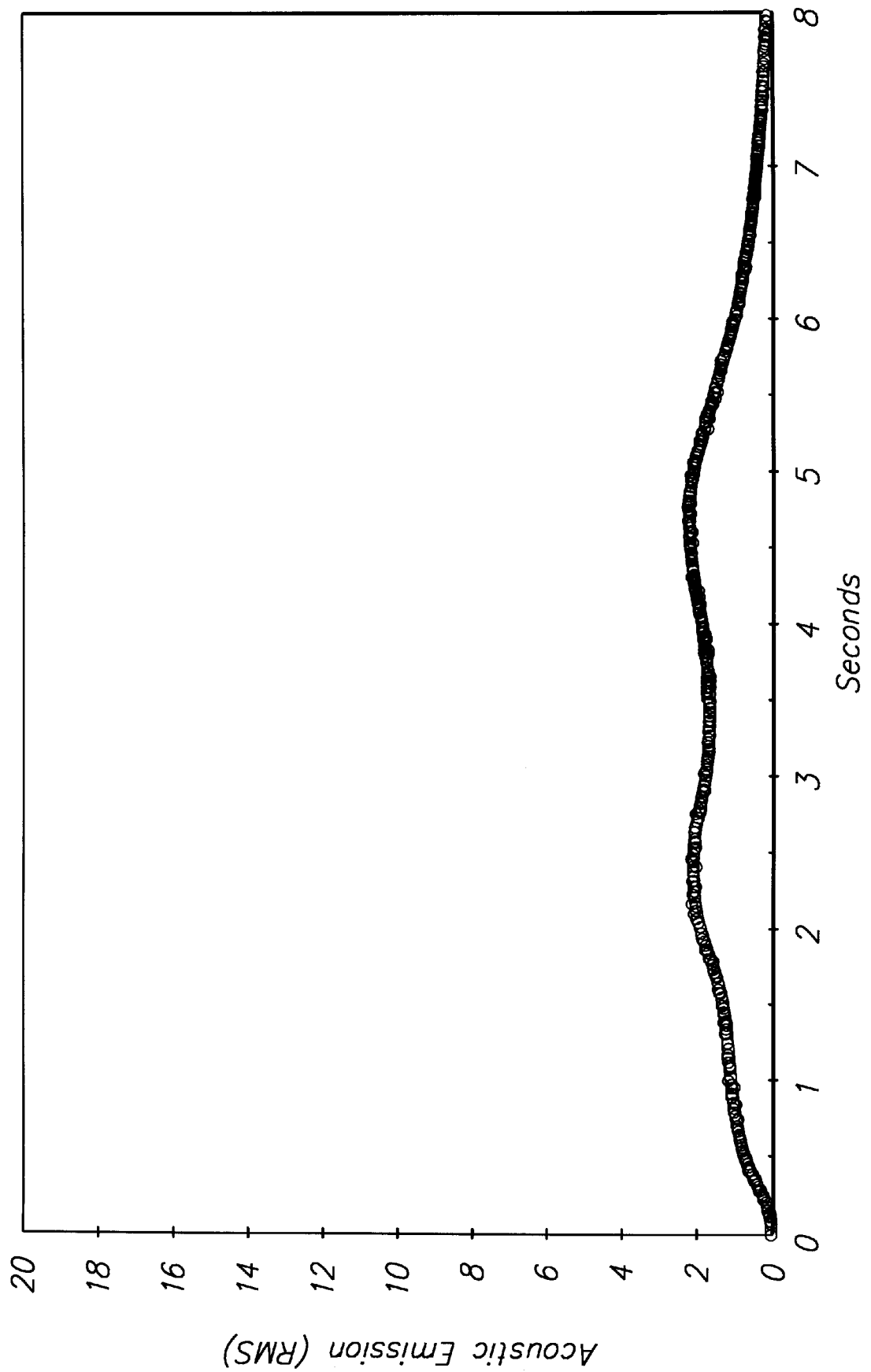

FIG. 9A shows a graph of the root mean square (rms) acoustic emission (AE) signature for a conventionally laser-textured magnetic disk, on start-up, showing the presence of resonance believed to be caused by the well-defined periodicity of the bump height, shape, or mark radius and separation of the laser marks produced by conventional laser texturizing. FIG. 9B shows a graph of the rms AE signature for a conventionally mechanically-textured magnetic disk, on start-up, showing the absence of resonance, believed to be due to the non-periodicity or substantial randomness of the heights, shapes or sizes and separations of the surface features produced by mechanical or sputtering texturing. It is believed that embodiments of the present invention, produced with at least one of the dimensions such as the bump height, the crater depth, the mark radius, the bump radius of curvature or the crater radius of curvature of the laser marks, and, optionally, also the separation between the laser marks, distributed according to one or more selected distributions of random variables, would have rms AE signatures substantially similar to the graph shown in FIG. 9B, due to the non-periodicity or substantial randomness of the bump height, crater depth, shape (characterized by bump radius of curvature and/or crater radius of curvature) or mark radius of the laser marks, and, optionally, the separation between the laser marks produced by laser-texturing magnetic recording media in accordance with embodiments of the present invention.

Figure 10A:
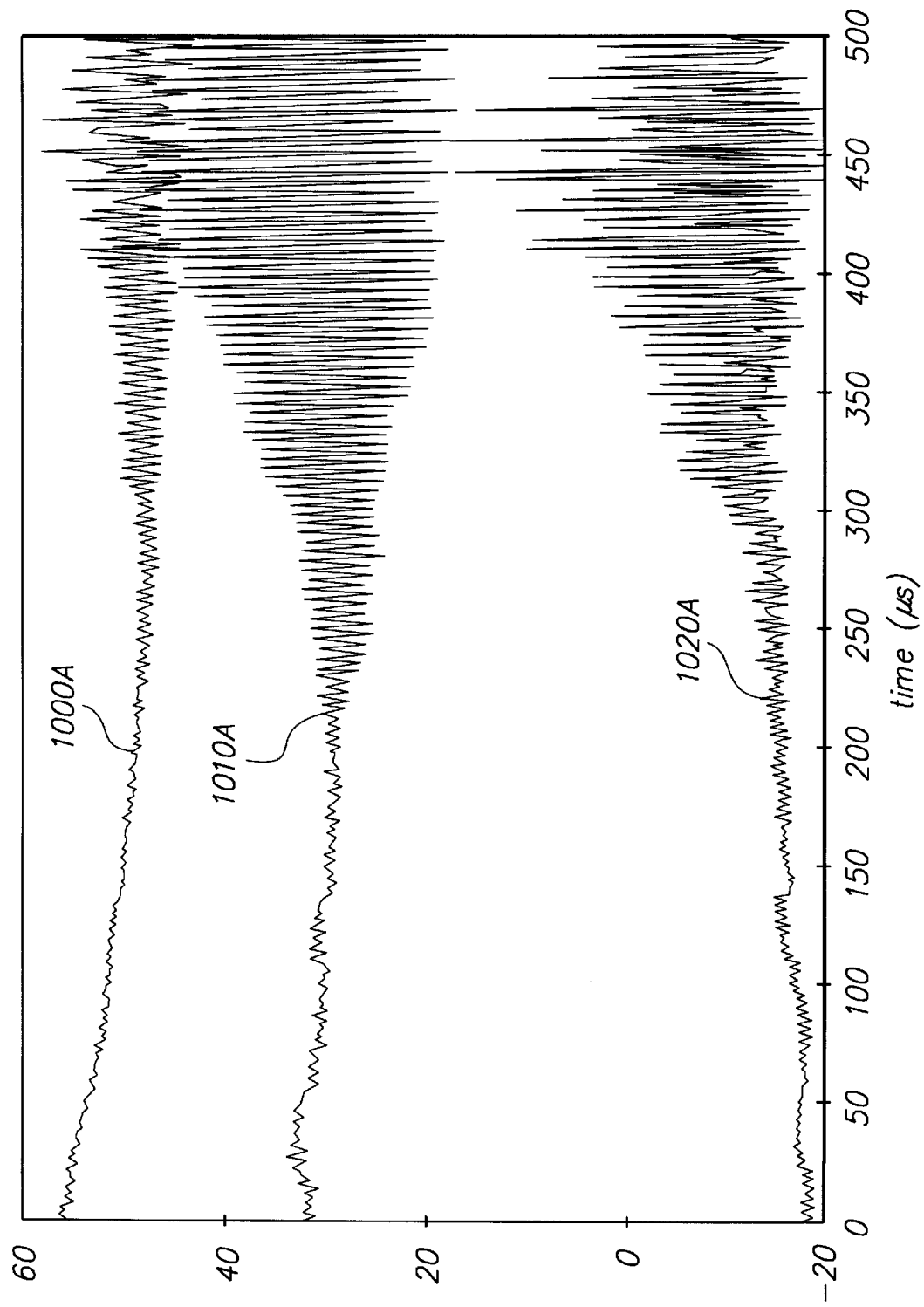
FIGS. 10A and B are graphs of slider-disk interface (SDI) responses of a conventionally laser-texturized magnetic disk and a randomly laser-texturized magnetic disk in accordance with an embodiment of the present invention, respectively.

FIG. 10A is a graph of a typical slider-disk interface (SDI) response at 3600 rpm in the head contact region (such as head contact region 160 shown in FIG. 1) of a traditionally laser-texturized magnetic disk, starting with a 30 nm flying height. More particularly, FIG. 10A shows a typical SDI response of a traditionally laser-texturized magnetic disk having laser marks with a uniform bump height of 24 nm, a surface sigma of 4.5 nm (a measure of the substrate background noise, the variation of the surface of the substrate from the nominal plane) and a uniform separation between laser marks of 54 $\mu$m and a uniform bump radius of curvature of 28 $\mu$m. The top line tracing 1000A shows the flying height at the center of the data head 130 (the distance Zcg) measured in nm, the middle line tracing 1010A shows the difference between Zcg, measured over the data storage area (such as the data storage area 170 shown in FIG. 1), and the surface features on the magnetic disk (this difference being the gap) measured in nm, and the bottom line tracing 1020A shows the head/disk contact force (Fc-20) measured in milliNewtons (mN) and shown displaced downwards by 20 mN (for the sake of convenience in FIG. 10A).

Figure 10B:
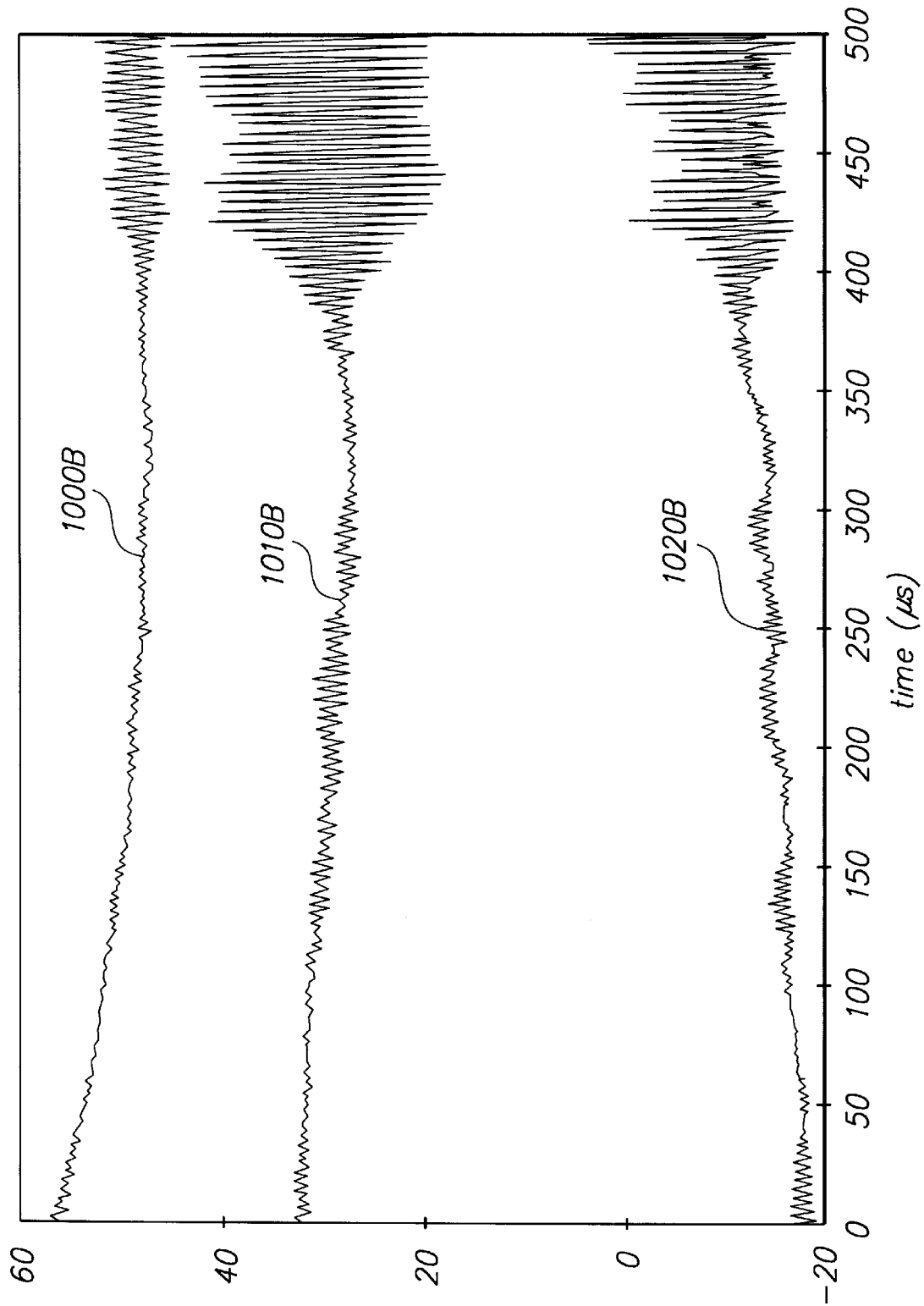

FIG. 10B shows, by contrast, an SDI response of a randomly laser-texturized magnetic disk in accordance with an embodiment of the present invention, the randomly laser-texturized magnetic disk having the bump heights of the laser marks distributed according to a uniform distribution, as shown in FIG. 8B, with bump heights in the range of about 9 nm to about 33 nm, a separation between laser marks in the range of about 4 $\mu$m to about 86 $\mu$m and the bump radii of curvature of the laser marks in the range of about 3 $\mu$m to about 46 $\mu$m. The top line tracing 1000B shows the flying height at the center of the data head 130 (the distance Zcg) measured in nm, the middle line tracing 1010B shows the difference between Zcg, measured over the data storage area 170, and the surface features on the magnetic disk (the gap) measured in nm, and the bottom line tracing 1020B shows the head/disk contact force (Fc-20) measured in milliNewtons (mN) and shown displaced downwards by 20 mN (for the sake of convenience in FIG. 10B). As may be seen by comparing FIGS. 10A and 10B, the onset of resonances between the data head 130 and the upper surface 120 of the disk 100 may be delayed, and the magnitudes of the resonances and the head/disk contact forces may be less, when a randomly laser-texturized magnetic disk according to an embodiment of the present invention is used, as shown in FIG. 10B, than when the traditionally laser-texturized magnetic disk is used, as shown in FIG. 10A.

What is claimed is:

1. A device for storing magnetically readable data, the device comprising:

a disk including a substantially planar surface and a magnetizable film having a substantially uniform thickness formed over said substantially planar surface, said disk having an outer surface having a nominal surface plane, wherein said outer surface includes a plurality of marks, each mark having a bump height above said nominal surface plane, a crater depth below said nominal surface, a mark radius, a bump radius of curvature, a crater radius of curvature and a separation from a consecutive mark, and wherein at least one of said bump height, said crater depth, said mark radius, said bump radius of curvature, and said crater radius of curvature is randomly substantially varied for each mark and wherein said separation is randomly substantially varied for each mark.

2. The device of claim 1, wherein said mark radius, said bump radius of curvature, said crater radius of curvature, said crater depth and said bump height are each randomly substantially varied for each mark.

3. The device of claim 1, wherein said bump height, and said bump radius of curvature are randomly substantially varied for each mark.

4. The device of claim 3, where said bump height, said bump radius of curvature and said separation are each randomly distributed according to a uniform distribution for each mark.

5. The device of claim 1, wherein only one of a first pair of said bump height and said separation, a second pair of said crater depth and said separation, a third pair of said mark radius and said separation, a fourth pair of said bump radius of curvature and said separation and a fifth pair of said crater radius of curvature and said separation are randomly substantially varied for each mark.

6. The device of claim 1, wherein at least one of said bump height, said crater depth, said mark radius, said bump radius of curvature, said crater radius of curvature and said separation for each mark is randomly distributed according to a Gaussian uniform distribution.

7. The device of claim 1, wherein at least one of said bump height, said crater depth, said mark radius, said bump radius of curvature and said crater radius of curvature for each mark is randomly distributed according to a uniform distribution.

8. The device of claim 1, wherein at least one of said bump height, said crater depth, said mark radius, said bump radius of curvature and said crater radius of curvature for each mark is randomly distributed according to a Poisson-like distribution.

9. The device of claim 1, wherein at least one of said bump height, said crater depth, said mark radius, said bump radius of curvature and said crater radius of curvature for each mark is randomly distributed according to a Bernoulli-like binomial-like distribution.

10. The device of claim 1 prepared by a process comprising the step of creating the plurality of marks by concentrating a pulsed laser energy selectively upon the disk at a plurality of locations.

11. The device of claim 1 prepared by a process comprising the step of creating the plurality of marks by concentrating a pulsed laser energy selectively upon the disk at a plurality of locations; wherein a power level of the pulsed laser energy is randomly varied during the step of creating the plurality of marks.

12. The device of claim 1 prepared by a process comprising the step of creating the plurality of marks by concentrating a pulsed laser energy selectively upon the disk at a plurality of locations; wherein an angle of incidence of the pulsed laser energy with the normal surface plane is randomly varied during the step of creating the plurality of marks.

13. The device of claim 1 prepared by a process comprising the step of creating the plurality of marks by concentrating a pulsed laser energy selectively upon the disk at a plurality of locations; wherein a duration of firing of the pulsed laser energy is randomly varied during the step of creating the plurality of marks.

14. The device of claim 1 prepared by a process comprising the step of creating the plurality of marks by concentrating a pulsed laser energy selectively upon the disk at a plurality of locations; wherein a frequency of firing of the pulsed laser energy is randomly varied during the step of creating the plurality of marks.

15. The device of claim 1 prepared by a process comprising the steps of (i) creating the plurality of marks by concentrating a pulsed laser energy selectively upon the disk at a plurality of locations and (ii) rotating the disk at a rotational speed which is randomly varied during the step of creating the plurality of marks.

16. The device of claim 1 prepared by a process comprising the steps of (i) creating the plurality of marks by concentrating a pulsed laser energy selectively upon the disk at a plurality of locations and (ii) linearly translating the disk at a speed which is randomly varied during the step of creating the plurality of marks.

17. The device of claim 1 prepared by a process comprising the steps of (i) creating the plurality of marks by concentrating a pulsed laser energy selectively upon the disk at a plurality of locations and (ii) moving the disk at a speed which is randomly varied during the step of creating the plurality of marks.

18. The device of claim 1, wherein the values of at least one of said bump height, said crater depth, said mark radius, said bump radius of curvature, said crater radius of curvature and said separation for at least two marks randomly substantially differ by more than a difference caused by uncontrolled manufacturing tolerances.

19. The device of claim 1, wherein the values of at least one of said bump height, said crater depth, said mark radius, said bump radius of curvature, said crater radius of curvature and said separation randomly substantially differ for at least two marks by more than three times a difference caused by uncontrolled manufacturing tolerances.

20. A disk drive assembly comprising:

a base having a rotatable spindle mounted thereon;

a disk rotatably mounted on said rotatable spindle, said disk including substantially rigid, non-magnetizable substrate having a substantially planar surface and a magnetizable film having a substantially uniform thickness formed over said substantially planar surface, said disk having an outer surface having a nominal surface plane, wherein said outer surface includes a plurality of marks, each mark having a bump height above said nominal surface plane, a crater depth below said nominal surface, a mark radius, a bump radius of curvature, a crater radius of curvature and a separation from a consecutive mark, and wherein at least one of said bump height, said crater depth, said mark radius, said bump radius of curvature, and said crater radius of curvature is randomly substantially varied for each mark and wherein said separation is randomly substantially varied for each mark; and an actuator arm rotatably mounted on said base, said actuator arm having a magnetic data transducing head mounted thereon to read first magnetically readable data from said disk and to store at least one of said first magnetically readable data and second magnetically readable data on said disk.

* * * * *